US012355174B2

(12) United States Patent
Mettavant et al.

(10) Patent No.: US 12,355,174 B2
(45) Date of Patent: Jul. 8, 2025

(54) CONNECTION ASSEMBLY FOR A CONNECTOR SOCKET

(71) Applicant: Tyco Electronics France SAS, Pontoise (FR)

(72) Inventors: Alexis Mettavant, Pontoise (FR); Imad Smirani, Pontoise (FR); Xavier Rouillard, Pontoise (FR)

(73) Assignee: TE Connectivity Solutions GmbH, Schaffhausen (CH)

( * ) Notice: Subject to any disclaimer, the term of this patent is extended or adjusted under 35 U.S.C. 154(b) by 357 days.

(21) Appl. No.: 18/159,755

(22) Filed: Jan. 26, 2023

(65) Prior Publication Data

US 2023/0246370 A1 Aug. 3, 2023

(30) Foreign Application Priority Data

Jan. 28, 2022 (FR) ...................................... 2200771

(51) Int. Cl.
*H01R 13/10* (2006.01)
*H01R 13/20* (2006.01)
*H01R 13/506* (2006.01)

(52) U.S. Cl.
CPC ............ *H01R 13/10* (2013.01); *H01R 13/20* (2013.01); *H01R 13/506* (2013.01)

(58) Field of Classification Search
None
See application file for complete search history.

(56) References Cited

U.S. PATENT DOCUMENTS

2009/0269958 A1 10/2009 Fujiwara et al.
2018/0076568 A1 3/2018 Thomas et al.

FOREIGN PATENT DOCUMENTS

| | | | | | |
|---|---|---|---|---|---|
| CN | 102113181 | B | * | 5/2015 | ......... H01R 13/7032 |
| CN | 109361121 | A | | 2/2019 | |
| DE | 19849140 | C1 | * | 3/2000 | ........... H01R 13/645 |
| DE | 102018127720 | B3 | * | 12/2019 | ............. H01R 13/17 |
| EP | 2218145 | A1 | | 8/2010 | |
| EP | 3276752 | A1 | | 7/2017 | |
| EP | 3480902 | A1 | * | 5/2019 | ........... H01R 13/207 |
| WO | 2009064484 | A1 | | 5/2009 | |

OTHER PUBLICATIONS

Search Report and Written Opinion from the Intellectual Property of France, Application No. FR2200771, Dated: Sep. 14, 2022, 8 pages.

* cited by examiner

*Primary Examiner* — Tho D Ta
(74) *Attorney, Agent, or Firm* — Barley Snyder

(57) ABSTRACT

An assembly includes an electrical connection terminal electrically connectable to a pin of a connector socket, the electrical connection terminal including a connecting portion and a crimping portion, and a ring assembled around the connecting portion. The crimping portion receives and crimps an electrical cable to be connected with the pin of the connector socket. The connecting portion receives the pin of the connector socket and has a side wall forming a circular cylinder structure. The side wall has an opening. The ring is connectable in a positive fit with a coding housing such that the coding housing is rotatably movable with respect to the electrical connection terminal.

20 Claims, 5 Drawing Sheets

CONNECTION ASSEMBLY FOR A CONNECTOR SOCKET

CROSS-REFERENCE TO RELATED APPLICATIONS

This application claims the benefit of the filing date under 35 U.S.C. § 119 (a)-(d) of France Patent Application No. 2200771, filed on Jan. 28, 2022.

FIELD OF THE INVENTION

The present invention relates to an assembly comprising an electrical connection terminal configured to be electrically connected to a pin of a connector socket.

BACKGROUND

In the field of electrical connectors, in particular those which equip electric vehicles, it is known to prevent connection errors between an electrical cable and a connector socket by a foolproof element. A foolproof element makes it possible to avoid a connection error of human or mechanical origin by only authorizing one corresponding socket and/or one single connection direction.

In known applications of circular cross-section terminals, such as illustrated in FIG. 1, it is known to insert an electrical connection terminal 1, once crimped to a cable 11, in a mainly tubular coding housing 3, comprising ribs 5 specifically adapted to corresponding notches 7 of a connector socket 9, in which the terminal 1 is intended to be plugged. The ribs 5 and the corresponding notches 7 serve as indicators to a cable operator to correctly plug the predetermined terminal 1 and socket 9 pairs. In the state of the art, the cable 11 crimped on the terminal 1 and the terminal 1 are rotatably fixed with one another by a crimping ferrule, which cannot be seen on the views of FIGS. 1 and 2. The assembly constituted by the cable 11 and the terminal 1 is also rotatably fixed with respect to the coding housing 3. Thus, the different elements of the assembly annotated 13 in FIG. 1, which comprises, in particular, a cover 15 and caps 17 snap-fitted to the cover 15, are rotatably immobile with respect to one another.

The terminal 1, comprised in the assembly 13, cannot be seen on the assembly 13 illustrated in FIG. 1, as it is hidden by the coding housing 3, the cover 15 and the caps 17. The terminal 1 in the assembly 13 can however be seen in the cross-sectional view according to FIG. 2. Thus, FIG. 2 shows a cross-sectional view of said assembly 13 plugged in the socket 9, showing the electrical connection terminal 1 plugged on a pin 17 of the socket 9. FIG. 2 highlights that the head 19*a* of a snap-fitting lance 19 of the coding housing 3, which can also be partially seen in FIG. 1, is snap-fitted in a through opening 21 of the terminal 1 (the through opening 21 as can be seen clearly in FIG. 1). The terminals 1 can be manufactured at a low cost by stamping from a strip of copper material, which is a manufacturing method enabling the formation of through openings 21, in particular by piercing. The through openings 21 are thus easy and economical to make and provide a simple device for holding, by snap-fitting, the coding housing 3 to the terminal 1. Snap-fitting, also called "snap-fit connection", of the snap-fitting lance 19 in the through opening 21 of the terminal 1 makes it possible to lock the movement in translation and in rotation of the coding housing 3 with respect to the terminal 1. That is why, in the assembly 13 known from the state of the art, the coding housing 3 is blocked in rotation with respect to the terminal 1. It is thus not possible for a cable operator to orient the coding housing 3, once the assembly 13 is assembled, with respect to the notches 7 of the socket 9.

Yet, it sometimes proves necessary to adjust the orientation of the ribs 5 of the coding housing 3 such that they are correctly snap-fitted in the notches 7 of the socket 9. The impossibility of a rotation movement of the coding housing 3 with respect to the terminal 1 is all the more disadvantageous when a pair of cables 11, such as represented in FIG. 1, is locked to a common cover 15. Indeed, it is necessary, in this case, that the two coding housings 3 have been correctly aligned during the mounting of the assembly 13. Otherwise, an angular offset of the ribs 5 with respect to the notches 7 will only be rectifiable by a disassembly and a new assembly of the assembly 13.

SUMMARY

An assembly includes an electrical connection terminal electrically connectable to a pin of a connector socket, the electrical connection terminal including a connecting portion and a crimping portion, and a ring assembled around the connecting portion. The crimping portion receives and crimps an electrical cable to be connected with the pin of the connector socket. The connecting portion receives the pin of the connector socket and has a side wall forming a circular cylinder structure. The side wall has an opening. The ring is connectable in a positive fit with a coding housing such that the coding housing is rotatably movable with respect to the electrical connection terminal.

BRIEF DESCRIPTION OF THE DRAWINGS

The invention and its advantages will be explained in more detail below, by way of embodiments and by referring in particular to the following accompanying figures, wherein.

DETAILED DESCRIPTION OF THE EMBODIMENT(S)

The invention will now be described in more detail by using advantageous embodiments as an example and in reference to the figures. The embodiments described are simply possible configurations and it should be kept in mind that the individual features can be provided independently from one another or can be omitted during the implementation of the present invention.

Figure 3:
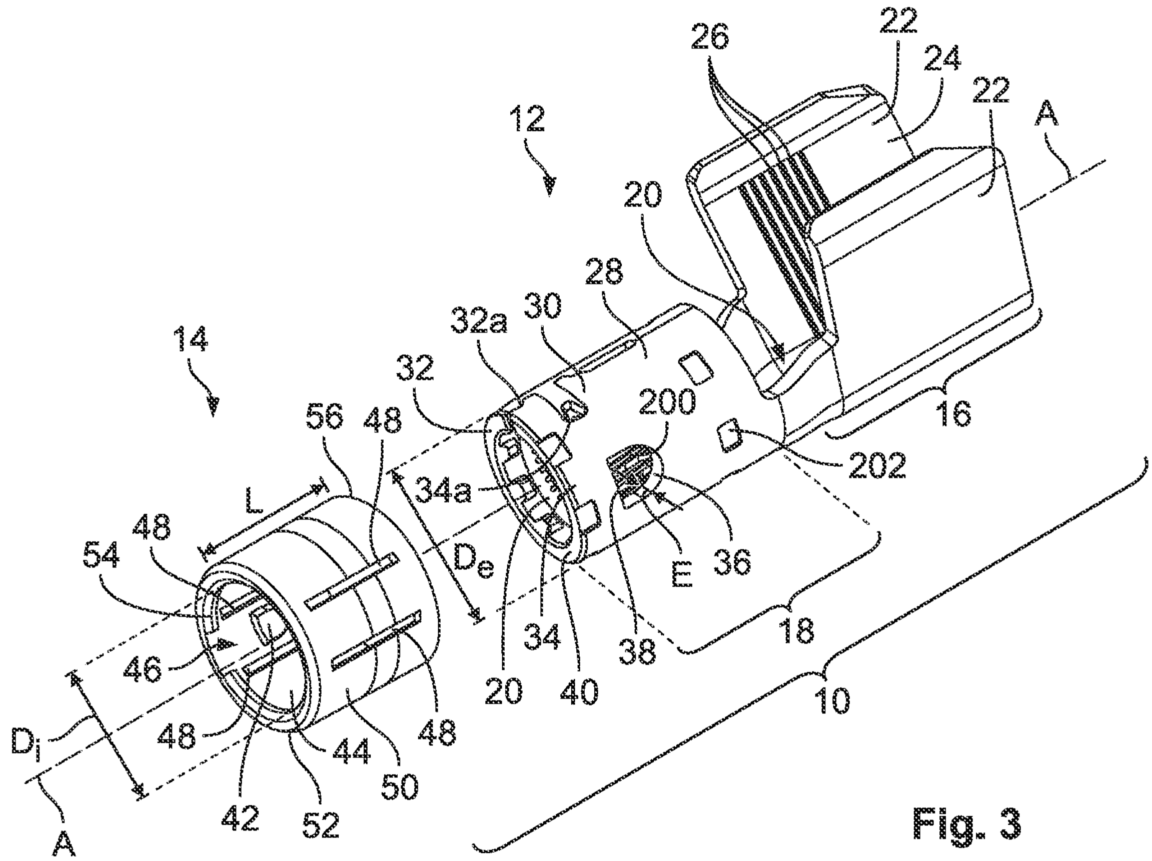
FIG. 3 is an exploded view of an assembly including an electrical connection terminal and a ring according to an embodiment.

An assembly 10 of an electrical connection terminal 12 and a ring 14 according to the present invention is illustrated in FIG. 3.

The electrical connection terminal 12 extends longitudinally along a central axis A. Along the central axis A, the electrical connection terminal 12 comprises two portions 16,

18. More specifically, the electrical connection terminal 12 comprises at least one crimping portion 16 and one connecting portion 18.

Figure 5:
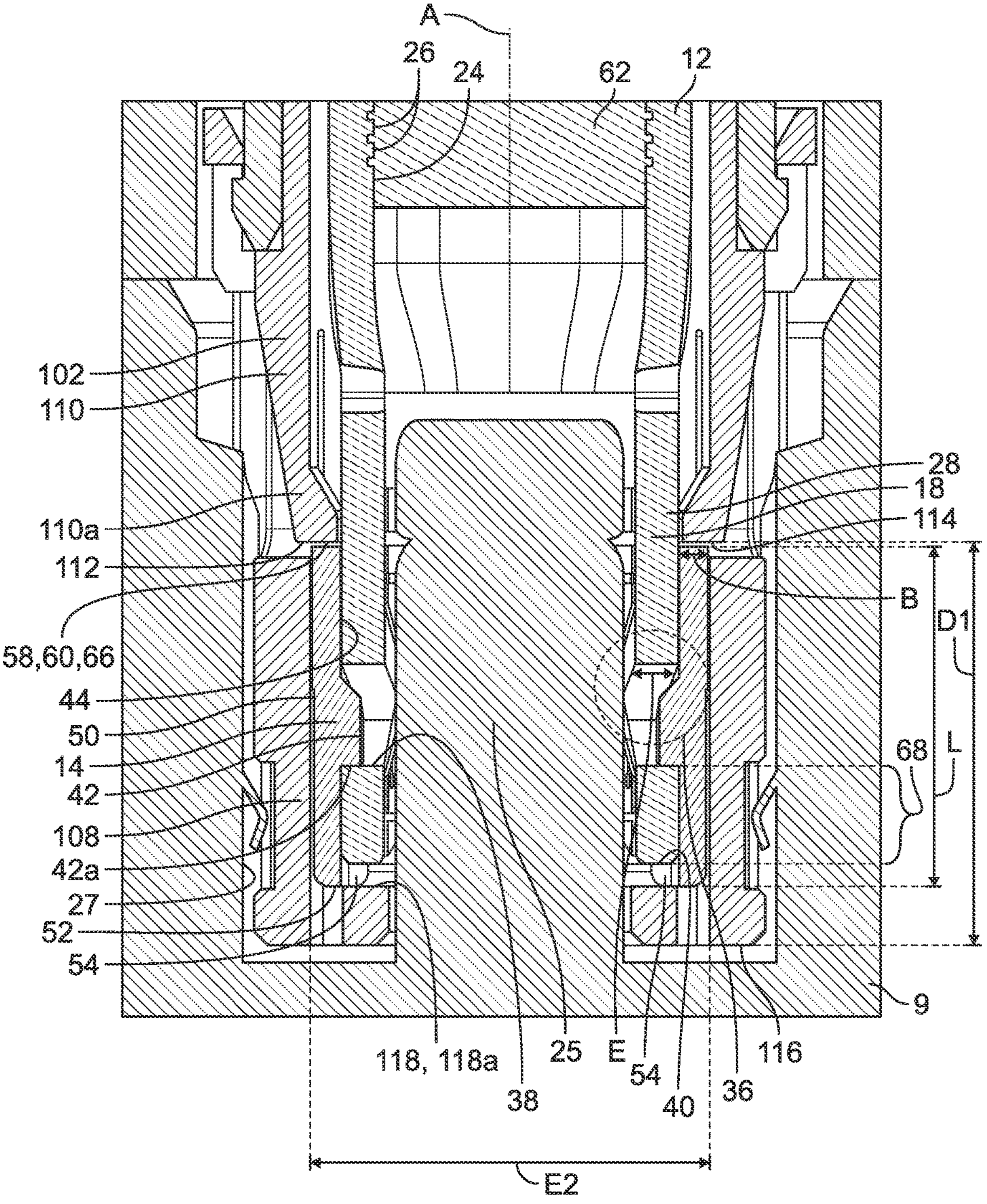
FIG. 5 is a detail sectional view of the assembly of FIG. 4.

The crimping portion 16 is configured to receive and crimp an electrical cable (not represented in FIG. 3, see reference 62 in FIG. 5) to be connected with the pin of the connector socket (not represented in FIG. 3, see references 9, 25 in FIG. 5). The crimping portion 16 includes a base 20 from which two walls 22, in particular symmetrical, extend on either side. The internal face 24 of the walls 22, i.e. the face intended to be in contact with an electrical cable (not represented in FIG. 3, see reference 62 in FIG. 5) can be equipped with a plurality of projecting retaining ribs 26 to improve the holding by crimping of the electrical cable to the terminal 12. The walls 22 are indeed configured to be folded on an electrical cable in order to hold it by crimping.

The connecting portion 18 is configured to receive a pin of the connector socket (not represented in FIG. 3, see references 9, 25 in FIG. 5). The connecting portion 18 comprises a side wall 28 forming a circular cylinder structure 30 in a cross-section perpendicular to the central axis A. In an embodiment, the circular cylinder structure 30 has a diameter of 8 mm. The circular cylinder structure 30 is obtained by the folding of two walls 32, 34, which extend on either side from the base 20 at the connecting portion 18. The respective free edges 32*a*, 34*a* of the walls 32, 34 have a geometric contour mainly complementary to one another, in order to form the side wall 28 into the circular cylinder structure 30.

The side wall 28 comprises at least one opening 36. The opening 36 can be a non-through recess or a through hole. In the embodiment illustrated in FIG. 3, the opening 36 is through, in that it forms a hole 36 extending through either side of the side wall 28, i.e. over the whole length of the thickness E of the side wall 28. The opening 36 has a mainly semi-elliptic shape, the flat base 38 of which is disposed on the side towards the end 40 of the connection portion 18. In the embodiment illustrated in FIG. 3, the side wall 28 comprises two through openings 36, although only one can be seen, due to the orientation of the terminal 12 in FIG. 3.

The electrical connection terminal 12 can be formed by stamping from a strip of copper material, which is an easy and economical manufacturing method to be performed, in particular compared with cold-formed or machined terminals. Furthermore, while it is rather easy to pierce through openings in stamped terminals made from a strip of copper material, it is not possible to form, at least easily, circumferential grooves (to obtain a shoulder) in terminals stamped from a strip of copper material. The ring 14 thus makes it possible to provide such a shoulder. In an embodiment, the side wall 28 of the connecting portion 18 can have no circumferential groove.

It is possible to see, through the opening 36 of FIG. 3, an annular spring 200, disposed inside the circular cylinder structure 30, which makes it possible to improve the electrical contact with a pin of a connector socket (not represented in FIG. 3, see FIG. 5). The annular spring 200 is retained to the circular cylinder structure 30 by retaining device 202, which in the example of FIG. 3, are semi-punctured 202, i.e. non-through recesses.

Figure 4:
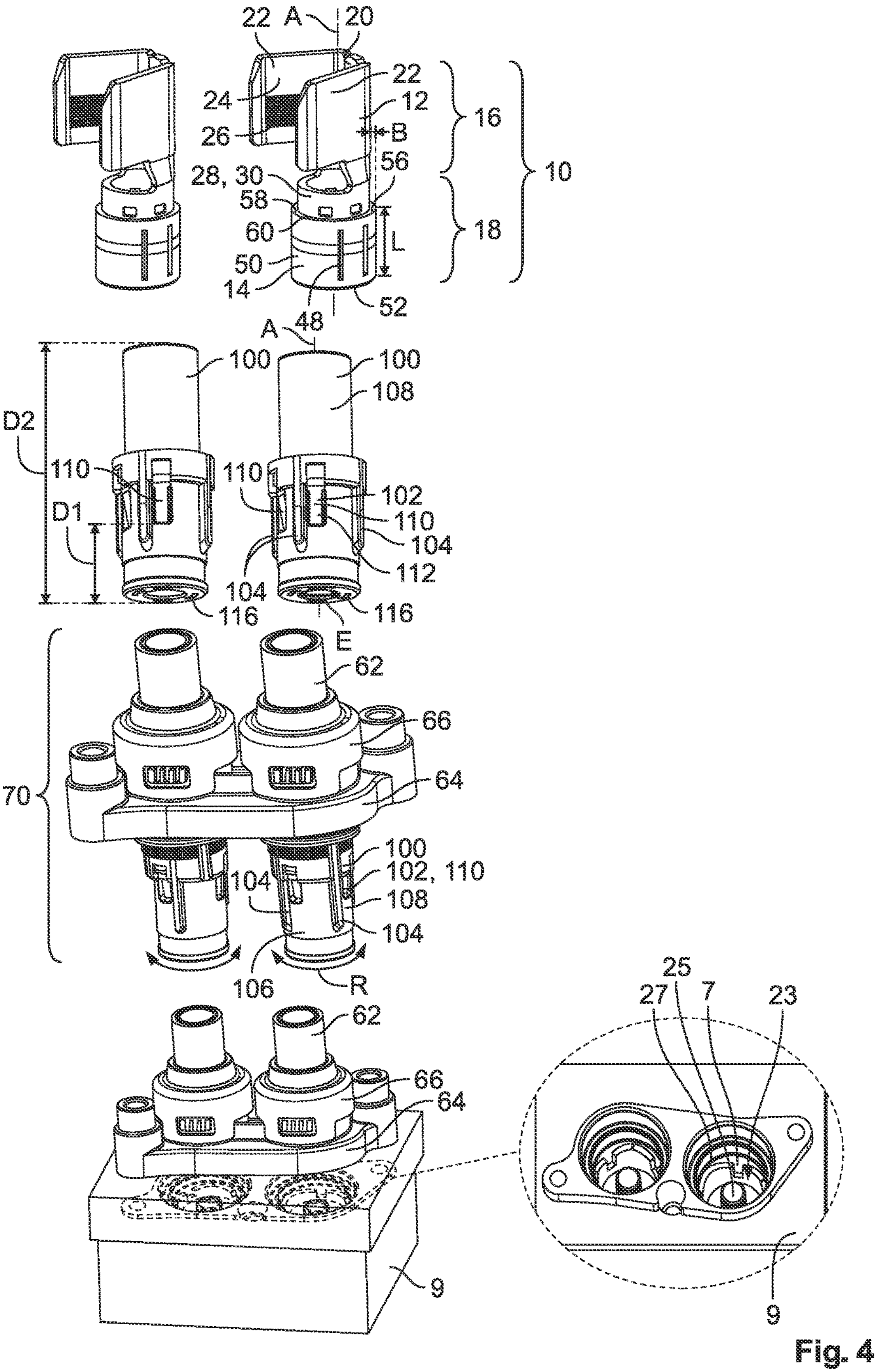
FIG. 4 is a partially exploded perspective view of an assembly according to an embodiment, including the assembly of FIG. 3.

According to the present invention, the assembly 10 further comprises the ring 14 of length L and internal diameter "Di" adapted to be equivalent to an external diameter "De" of the connecting portion 18. The ring 14 is thus sized to be arranged at least partially around the connecting portion 18, such as illustrated in FIG. 4. The ring 14 is held to the connecting portion 18 by the snap-fitting of a locking device 42 in the through opening 36. In the embodiment of the ring 14 illustrated in FIG. 3, the locking device 42 is formed by at least one protrusion 42 projecting from an internal face 44 of the ring 14 towards the inside 46 of the ring 14. The internal face 44 is intended to be in contact with the side wall 28 of the connecting portion 18, such as illustrated in FIG. 4. In the embodiment illustrated in FIG. 3, the ring 14 comprises two protrusions 42, although only one can be seen due to the orientation of the ring 14 in FIG. 3.

In the embodiment illustrated in FIG. 3, the ring 14 comprises a side wall 50 provided with two longitudinal openings 48, in particular rectilinear, extending respectively on either side of said protrusion 42 and parallel to the central axis A of the ring 14, aligned with the central axis A of the terminal 12. The presence of openings 48 on either side of the protrusion 42 makes it possible to increase the flexibility of the side wall 50 of the ring 14 at each protrusion 42. Thus, the snap-fitting of each protrusion 42, resulting from an elastic deformation of the side wall 50 of the ring 14, can be facilitated by the presence of the openings 48.

Furthermore, an axial end 52 of the ring 14 is partially provided with a rim 54 projecting towards the inside 46 of the ring 14. It results that the internal diameter "Di" of the ring 14 is reduced at the rim 54. This makes it possible to hold the end 40 of the connecting portion 18 abutted against the rim 54 of the ring 14 when the connecting portion 18 is at least partially inserted in the ring 14. This abutment can be seen more in the cross-sectional view of FIG. 5 described below.

The ring 14 is further provided with an end 56, which is axially opposite the end 52.

According to an embodiment of the invention, the ring 14 is made of plastic. Thus, the ring 14 can be easily made, in particular by plastic injection molding, and at a lesser cost. Furthermore, the plastic material makes it possible to not make the assembly 10 too heavy.

According to an embodiment illustrated in FIG. 4, in the assembly 10 assembled, the ring 14 is held by snap-fitting around the connecting portion 18, so as to laterally cover each of the through openings 36 of the terminal 12. The ring 14 therefore has a sufficient length L to cover each of the through openings 36 of the terminal 12. This is why the through openings 36 cannot be seen in the view of FIG. 4 (they are however in the cross-sectional view of FIG. 5).

In the assembly 10 assembled, such as illustrated in FIG. 4, an edge 58 of the ring 14 at its end 56 forms a shoulder 60 of width B in a radial direction with respect to the side wall 28 of the connecting portion 18. The width B mainly corresponds to the thickness B of the side wall 50 of the ring 14. In other words, the shoulder 60 provides a surface 60 of width B.

The object of the present invention is also achieved by a system comprising the assembly 10 according to one of the preceding embodiments and the coding housing 100. The advantages related to the assembly described in the preceding embodiments are also present in this system. The coding housing 100 may be made of a plastic material. The rotational movement of the coding housing 100 is described below, with respect to FIGS. 4 and 5.

Once a cable 62 is crimped to the assembly 10, i.e. in particular when a crimping ferrule is added to crimp a metal braid to the shielding according to the type of connector, the assembly 10—thereby crimped with the cable 62, can be assembled to a cover 64. The cable 62 is indirectly held to the cover 64 by a retaining cap 66 snap-fitted to the cover 64.

The coding housing 100, of mainly tubular shape, is sized so as to receive, at least partially, the assembly 10 according to the present invention, such that the ring 14 is radially arranged between the electrical connection terminal 12 and the coding housing 100. This arrangement is highlighted by the cross-sectional view of FIG. 5. With respect to a diameter E1 (see FIG. 2) of the internal recess of the coding housing 3 known from the state of the art, the coding housing 100 according to the present invention has an internal recess of wider diameter E2 (indicated in FIG. 5), in order to be able to accommodate the ring 14 therein, in addition to the electrical connection terminal 12. Consequently, with respect to the coding housing 3 known from the state of the art, the coding housing 100 according to the present invention can have a thinner side wall 108.

The coding housing 100 is assembled to the assembly 10 in order to provide a fault-preventing function. To this end, the coding housing 100 comprises at least one coding rib 104 projecting from an external face 106 of the side wall 108 of the coding housing 100. The external face 106 is intended to be in contact with a connector socket 9. Such a socket 9 is known from the state of the art. The socket 9 comprises a cylindrical cavity 23 in which a pin 25 projects. The perimeter 27 of the cylindrical cavity 23 comprises notches 7, the number and the shapes of which being complementary to the coding ribs 104. The coding housing 100 is provided with coding ribs 104, their number, their circumferential distribution and their dimension of which are specifically adapted to the notches 7 of the connector socket 9. The coding makes it possible to indicate to the cable operator, the correct connections to be made. This thus makes it possible to facilitate the assembly and to avoid the connection errors. The coding ribs 104 thus have a foolproof function.

The coding housing 100 is further provided with at least one snap-fitting device 102, in an embodiment two, each constituted by a lance 110 formed in the side wall 108 of the coding housing 100. The lances 110 can be seen more in the cross-sectional view of FIG. 5. Each of the lances 110 extends longitudinally along the central axis A and ends by a free end 112 comprising a polygonal-shaped lance head 110, i.e. comprising several flat faces forming ridges together. In particular, the lance head 110*a* comprises a flat surface 114 which extends perpendicularly to the central axis A. The flat surface 114 is arranged along the axis A at a distance D1 of a free end 116 of the coding housing 100. A total length D2 of the coding housing 100 (see FIG. 4) and the distance D1 (see FIG. 5), in particular the ratio D1/D2, are adapted such that the lance head 110*a*, in particular the flat surface 114 of the lance 110, faces the shoulder 60 of the ring 14, such that the coding housing 100 is rotatably movable with respect to the terminal 12 and to the ring 14 (the rotational movement is indicated by an arrow R in FIG. 4). In the view of FIG. 5, an assembling clearance is present between the flat surface 114 of the free end 112 of the lance 110 and the surface 60 of the ring 14. However, in another assembled state, not represented, there can be a surface contact between the flat surface 114 and the surface 60, such that the free end 112 of the lance 110 bears on the surface 60 of the ring 14. In both cases, the coding housing 100 is rotatably movable with respect to the electrical connection terminal 12. Thus, even in the variant, where the free end 112 of the lance 110 bears on the surface 60 of the ring 14, the corresponding friction force is quite low to enable a free rotation of the coding housing 100 with respect to the terminal 12.

Figure 1:
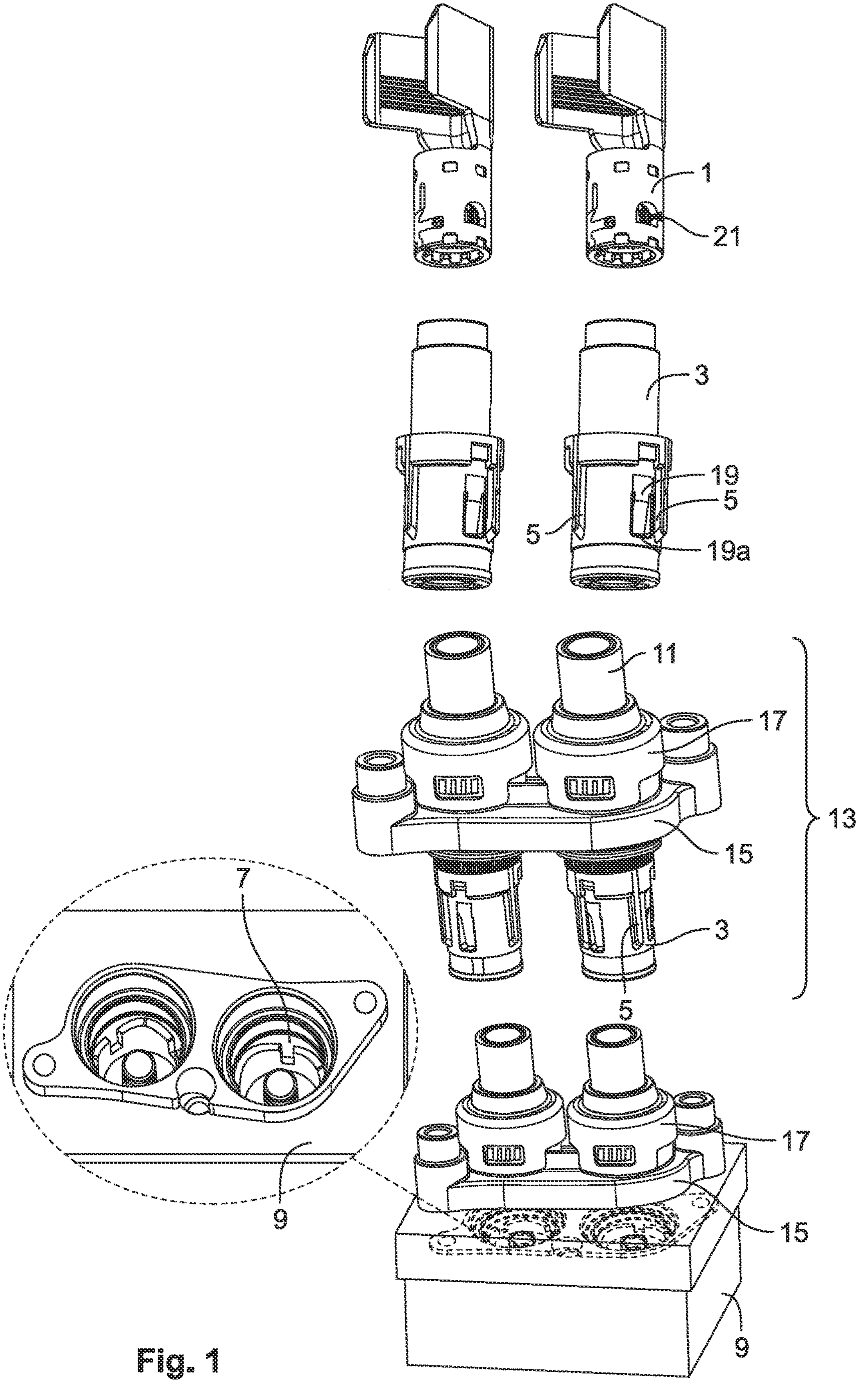
FIG. 1 is a partially exploded perspective view of an assembly according to the state of the art.
Figure 2:
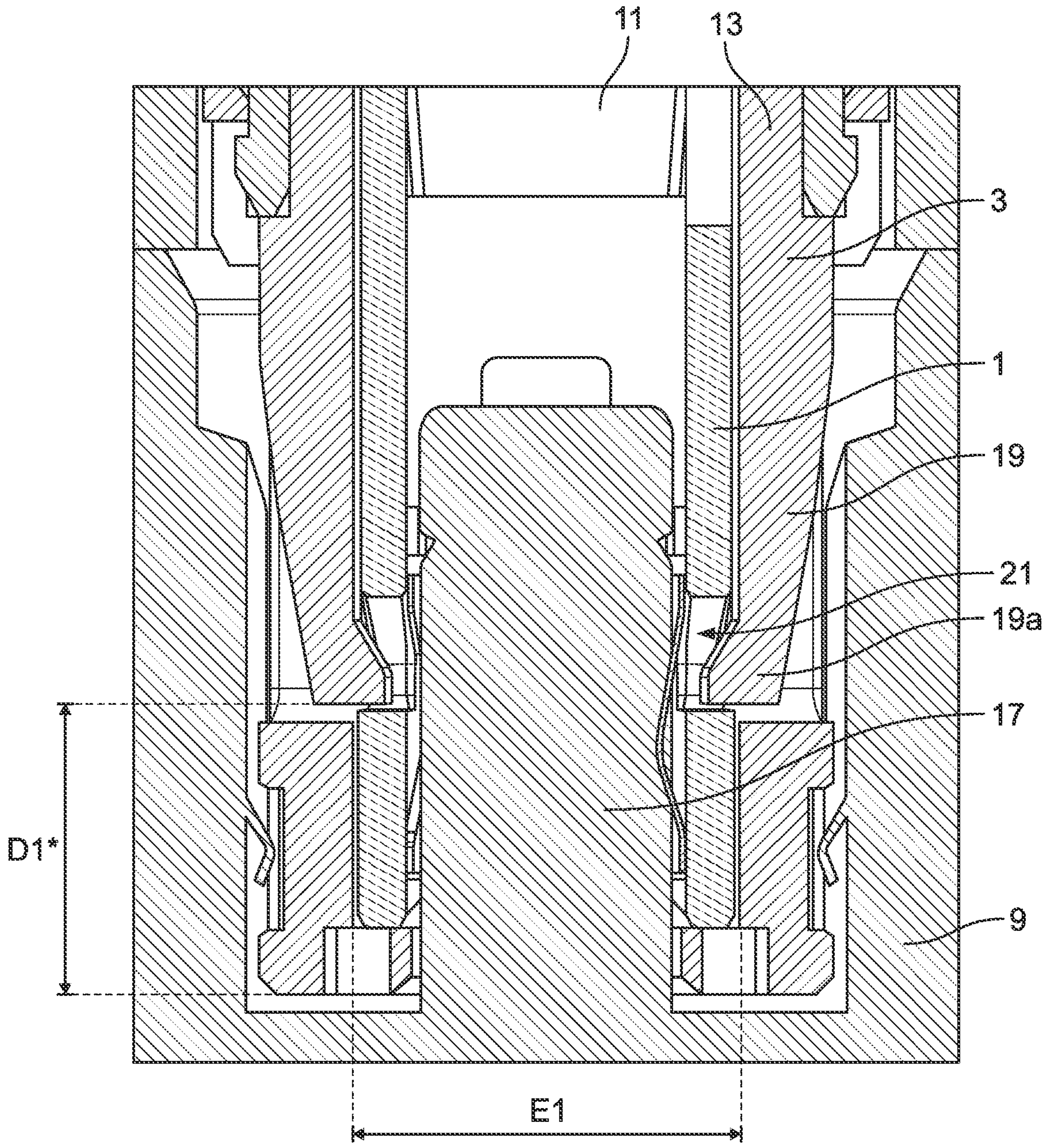
FIG. 2 is a detail sectional view of the assembly of FIG. 1.

The ratio D1/D2 of the coding housing 100 according to the present invention is different from the ratio D1*/D2 of the coding housing 3 of FIGS. 1 and 2, as the lances 110 of the coding housing 100 are shorter than those of the state of the art, since they do not have to extend to the openings 36, but only to the edge 58 of the ring 14. Due to this, the distance D1* is shorter than the distance D1.

In an embodiment, the electrical connection terminal 12 can be identical to the electrical connection terminal 1 of the state of the art illustrated in FIGS. 1 and 2. The electrical connection terminal 1 can thus be used, just as well in an assembly where a rotation of the coding housing 100 is desired, thanks to the presence of the ring 14 according to the present invention, and in an assembly in which a fixed rotatable holding is necessary.

FIG. 5 as a cross-section also shows the connection by snap-fitting between the ring 14 and the connecting portion 18 of the terminal 12. A flat bearing surface 42*a* of the protrusion 42 of the ring 14 is abutted against the flat base 38 of the semi-elliptic through opening 26 in a direction parallel to the axis A. Such as also illustrated in FIG. 5, a part 68 of the connecting portion 18 is held to the ring 14 in a positive fit in a recess defined between the flat bearing surface 42*a* of the protrusion 42 of the ring 14 and of the rim 54 of the ring 14. The ring 14 is thus specifically adapted to provide a connection by snap-fitting with a through opening 36 of the terminal 12, as well as a connection in a positive fit between the ring and the part 68 of the terminal 12. The ring 14 and the terminal 12 can thus be assembled to one another easily and without needing additional fixing means nor tools. In an embodiment, the part 68 of the connecting portion 18 is defined between the at least one opening 36 and a free axial end 40 of the connecting portion 18.

The ring 14 thus makes it possible to prevent a rotatable blocking of the coding housing 100 with respect to the electrical connection terminal 12. The ring 14 enables a rotation R of the coding housing 100 with respect to the electrical connection terminal 12 by making a movement of the snap-fitting device 102 of the coding housing 100 possible over the circumference of the shoulder 60 of the ring 14. A cable operator can thus readjust the annular orientation of the coding ribs 104 of the coding housing 100, even when the housing 100 is assembled in an assembly 70, such as illustrated in FIG. 4, by rotating the coding housing 100 in a direction according to the arrow R (see FIG. 4).

Furthermore, there is no need to design new terminals, which makes it possible to optimize the design and manufacturing costs, as it is possible to use the stamped terminals 1 made from a strip of copper material of the state of the art, such as illustrated in FIGS. 1 and 2.

FIG. 5 as a cross-section also shows that an end 116 of the coding housing 100 comprises a counterbore 118, i.e. a flat-bottomed bore, forming a retaining surface 118*a* on which the rim 54 of the ring 14 bears in a direction parallel to the axis A. Thus, a longitudinal movement along the axis A of the ring 14 with respect to the coding housing 100 is stopped by the abutment of the rim 54 of the ring 14 on the counterbore 118 of the coding housing 100. On the other hand, a housing is defined between the retaining surface 118*a* of the counterbore 118 and the flat surface 114 of the snap-fitting device 102 of the coding housing 100, in which the ring 14 is held in translation in a positive fit. Thus, a longitudinal movement along the axis A of the ring 14 with respect to the coding housing 100 is prevented, while a rotation R of the coding housing 100 with respect to said assembly 10 is enabled.

With the opening 36 of the terminal 12 being covered by the ring 14, it is no longer possible for a snap-fitting device 102 of the coding housing 100 to be snap-fitted therein.

Thus, by covering the opening 36 of the connecting portion 18, the ring 14 makes it possible to avoid a locking, i.e. blocking, a rotation of the coding housing 100 with respect to the electrical connection terminal 12.

The opening 36 of the connecting portion 18, usually intended to receive a snap-fitting device of the coding housing, can serve another and new function: the opening 36 enables a connection by snap-fitting of the ring 14 to the electrical connection terminal 12.

The different embodiments described above can be combined together. The number of coding ribs 104 of the coding housing 100 is not limiting, just like the number of openings 36 and the number of lances 110. The shape of the structural elements, like the coding ribs 104, the openings 36, the locking device 102 can be adapted according to the embodiment of the present invention.

The present invention thus has the object of facilitating the assembly with the socket 9, in particular by making an angular adjustment of a coding housing possible for the plugging in the socket 9, and while optimizing the design and manufacturing costs, for example, by avoiding using cold-formed or machined terminals, which are obtained by manufacturing methods that are more expensive than stamping.

What is claimed is:

1. An assembly, comprising:

an electrical connection terminal electrically connectable to a pin of a connector socket, the electrical connection terminal including a connecting portion and a crimping portion, the crimping portion receiving and crimping an electrical cable to be connected with the pin of the connector socket, the connecting portion receiving the pin of the connector socket and having a side wall forming a circular cylinder structure, the side wall having an opening; and a ring assembled around the connecting portion and connectable in a positive fit with a coding housing such that the coding housing is rotatably movable with respect to the electrical connection terminal.

2. The assembly according to claim 1, wherein the ring is arranged around the connecting portion and laterally covers the opening.

3. The assembly according to claim 1, wherein the ring is assembled by snap-fitting to the connecting portion.

4. The assembly according to claim 3, wherein the ring has a locking device snap-fitted in the opening of the connecting portion.

5. The assembly according to claim 4, wherein the locking device is formed by a protrusion projecting from an internal face of the ring towards an inside of the ring.

6. The assembly according to claim 5, wherein the internal face is in contact with the side wall of the connecting portion.

7. The assembly according to claim 6, wherein the ring has a pair of longitudinal openings extending along opposite sides of the protrusion and parallel to a central longitudinal axis of the ring.

8. The assembly according to claim 5, wherein a part of the connecting portion is held to the ring by a connection in a positive fit in a recess defined between the protrusion of the ring and a rim of the ring radially projecting towards the inside of the ring.

9. The assembly according to claim 8, wherein the part of the connecting portion is defined between the opening and a free axial end of the connecting portion.

10. The assembly according to claim 1, wherein the ring is made of plastic.

11. The assembly according to claim 1, wherein the electrical connection terminal is a stamped terminal made from a strip of copper material.

12. The assembly according to claim 11, wherein the opening is a through opening.

13. The assembly according to claim 1, wherein the side wall of the connecting portion has no circumferential groove.

14. The assembly according to claim 1, wherein the crimping portion has a plurality of retaining ribs projecting from a face of the crimping portion that contacts the electrical cable.

15. A system, comprising:

a coding housing; and an assembly inserted into the coding housing, the assembly includes an electrical connection terminal electrically connectable to a pin of a connector socket, the electrical connection terminal including a connecting portion and a crimping portion, and a ring assembled around the connecting portion, the crimping portion receiving and crimping an electrical cable to be connected with the pin of the connector socket, the connecting portion receiving the pin of the connector socket and having a side wall forming a circular cylinder structure, the side wall having an opening, the ring is connectable in a positive fit with the coding housing such that the coding housing is rotatably movable with respect to the electrical connection terminal, the ring is radially disposed between the electrical connection terminal and the coding housing.

16. The system according to claim 15, wherein the coding housing has a coding rib projecting from an external face of the coding housing.

17. The system according to claim 16, wherein the external face is in contact with the connector socket.

18. The system according to claim 15, wherein the coding housing includes a snap-fitting device constituted by a lance formed in a side wall of the coding housing.

19. The system according to claim 18, wherein a length of the lance is adapted such that a free end of the lance faces a rim of the ring in a direction parallel to a longitudinal axis of the ring.

20. The system according to claim 19, wherein a positive fit connection between the coding housing and the ring is made by an axial arrangement of the ring between the free end of the lance and a counterbore of an end of the coding housing, a diameter of the counterbore allows a pin of a connector socket to pass through.

* * * * *